US00H002121H

(19) United States

(12) Statutory Invention Registration (10) Reg. No.: US H2121 H

Rolison et al. (43) Published: Aug. 2, 2005

(54) HIGH SURFACE AREA, NANOSCALE, MESOPOROUS MANGANESE OXIDES WITH CONTROLLED SOLID-PORE ARCHITECTURES AND METHOD FOR PRODUCTION THEREOF

(75) Inventors: Debra R. Rolison, Arlington, VA (US); Jeffrey W. Long, Alexandria, VA (US); Karen S. Lyons, Arlington, VA (US)

(73) Assignee: The United States of America as represented by the Secretary of the Navy, Washington, DC (US)

(21) Appl. No.: 09/689,700

(22) Filed: Oct. 13, 2000

(51) Int. Cl.[7] ..... C01G 57/00

(52) U.S. Cl. ..... 423/605

(58) Field of Search ..... 423/605; 429/224

(56) References Cited

U.S. PATENT DOCUMENTS

| | | | |
|---|---|---|---|
| 4,246,253 A | | 1/1981 | Hunter |
| 4,284,618 A | | 8/1981 | van der Heyden et al. |
| 4,476,104 A | | 10/1984 | Mellors |
| 4,667,417 A | | 5/1987 | Graser et al. |
| 4,894,357 A | | 1/1990 | Hupe et al. |
| 5,135,732 A | | 8/1992 | Barboux et al. |
| 5,156,934 A | | 10/1992 | Kainthia et al. |
| 5,196,279 A | | 3/1993 | Tarascon |
| 5,227,342 A | | 7/1993 | Anderson et al. |
| 5,275,796 A | | 1/1994 | Tillotson et al. |
| 5,395,805 A | | 3/1995 | Droege et al. |
| 5,409,683 A | | 4/1995 | Tillotson et al. |
| 5,601,952 A | | 2/1997 | Dasgupta et al. |
| 5,604,057 A | | 2/1997 | Nazri |
| 5,674,642 A | | 10/1997 | Le et al. |
| 5,674,644 A | | 10/1997 | Nazri |
| 5,963,417 A | | 10/1999 | Anderson et al. |
| 6,071,486 A | * | 6/2000 | Koehlert et al. |
| 6,071,647 A | | 6/2000 | Treuil et al. |

OTHER PUBLICATIONS

Yamamoto, et al., "Micro–rings of Manganese Dioxide Nanocrystals on Mica", Chemistry Letters 1998, pp. 809–10.*

Y. Chabre and J. Pannetier, *Progress in Solid State Chemistry*, 1996, 23, 1–130, no month.

M. M. Thackeray, *Progress in Solid State Chemistry*, 1997, 25, 1–71, no month.

J.J. Xu, A. J. Kinser, B.B. Owens, and W.H. Smyrl, *Electrochemical and Solid–State Letters*, 1998, 1, 1–3, no month.

S. Bach, J.P. Pereira–Ramos, N. Baffer, and R. Messina, *Electrochimica Acta*, 1992, 37, 1301, no month.

H. Kurimoto, K. Suzuoka, T. Murakami, Y. Xie, H. Nakamura, and M. Yoshio, *Journal of the electrochemical Society*, 1995, 142, 2150–2162, July.

A. Manthiram and J. Kim, *Chemistry of Materials*, 1998, 10, 2895–2909, no month.

N. Husing and U. Schubert, *Angewandte Chemie—International Edition*, 1998, 37, 22–45, no month.

K. Salloux, F. Chaput, H.P. Wong, B. Dunn, and M. W. Breiter, *Journal of the Electrochemical Society*, 1995, 142, L191–L192, no month.

(Continued)

*Primary Examiner*—Aileen B. Felton

(74) *Attorney, Agent, or Firm*—John J. Karasek; Philip E. Ketner

(57) ABSTRACT

Nanoscale, mesoporous manganese oxide materials aerogels and ambigels are prepared by altering the method for removing pore liquid from manganese oxide gels. By removing pore fluid under conditions where capillary forces are substantially absent, materials exhibiting a desired high mesoporosity and high surface area can be obtained.

21 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

D.B. Le, S. Passerini, J. Guo, J. Ressler, B.B. Owens, and W.H. Smyrl, *Journal of the Electrochemical Society*, 1996, 143, 2099–2104, July.
D.B. Le, S. Passerini, A. L. Tipton, B.B. Owens, and W.H. Smyrl, *Journal of the Electrochemical Society*, 1995, 142, L102–L103, June.
F. Coustier, S. Passerine and W.H. Smyrl, *Journal of the Electrochemical Society*, 1998, 145, L73–L74, May.
J. H. Harreld, W. Dong, and B. Dunn, *Materials Research Bulletin* 1998, 33, 561–567, no month.
S. Bach, M. Henry, N. Baffler, and J. Livage, *Journal of Solid State Chemistry*, 1990, 88, 325–333, no month.
Z.–R. Tian, W. Tong, J.–Y. Wang, N.–G. Duan, V. V. Krishnan, S. L. Suib, *Science*, 1997, 276, 926–930, May.
J. Luo and S. L. Suib, *Journal of the Chemical Society—Chemical Communications*, 1997, 1031–1032, no month.
W. Dong, et al., "Electrochemical and Solid–State Letters," 2000, 3, 457–459, Aug.
J.W. Long, et al., "Electrochemical and Solid–State Letter," 2000, 3, 453–456, Aug.
J. Koresh, et al., "Journal of the Electrochemical Society," 1977, 124, 1379–1385, no month.
S. Ardizzone, et al., "Journal of Electrochemical Society," 1982, 129, 1689–1693, no month.
Long, Swider–Lyons, Stroud, Rolison, Design of Pore and Matter Archetectures in Manganese Oxide Charge–Storage Materials, Electrochemical and Solid State Letters, 3 (100 453–456 (200).

* cited by examiner

HIGH SURFACE AREA, NANOSCALE, MESOPOROUS MANGANESE OXIDES WITH CONTROLLED SOLID-PORE ARCHITECTURES AND METHOD FOR PRODUCTION THEREOF

FIELD OF THE INVENTION

The present invention relates to methods for making high surface area, nanoscale, mesoporous manganese oxide materials with controlled solid-pore architecture.

BACKGROUND OF THE INVENTION

Manganese oxide materials (as used herein, manganese oxide materials are denoted as $MnO_2$, but refers to all species of manganese oxide compounds including, but not limited to: $MnO_2$, $MnO_x$, $MnO_x$. $yH_2O$, or $MnO_xH_y$, where x=1.5 to 2.5 and y=0.5 to 2, doped manganese oxides, and $AMnO_2$ where A= alkali-metal or alkaline-earth cations) have long been explored for use as cathode materials for batteries, and manganese oxide is used in the familiar 1.5-volt commercial $Zn/MnO_2$ alkaline cells (Chabre et al.,1995). More recently, manganese oxide materials have been studied as intercalation hosts for lithium batteries (Thackeray, 1997), which can provide voltages of 3 to 5 volts. The intense interest in manganese oxide as a battery material is because of its low cost and low toxicity relative to other high performance metal oxide battery materials such as $NiO_2$, $CoO_2$, and $V_2O_5$.

The discharge processes at $MnO_2$ are accomplished by the intercalation of either protons or lithium cations into the $MnO_2$ structure. This process is accompanied by a simultaneous reduction of the manganese sites to maintain charge balance:

$$MnO_2+xH^++xe\rightarrow H_xMnO_2$$

$$MnO_2+xLi^++xe\rightarrow Li_xMnO_2$$

The protons or lithium ions intercalated into the $MnO_2$ structure are supplied by the electrolyte at the electrode/electrolyte interface. Charge storage is further facilitated by diffusion of protons or lithium cations though the bulk of the structure.

Although $MnO_2$ materials are relatively inexpensive and are currently used in commercial batteries, some problems remain, particularly with respect to lithium battery applications. For example, electrodes made from manganese oxide spinels have poor conductivity and require the addition of conductive fillers such as carbon to enhance conductivity. However, adding such fillers reduces the energy density of the electrode. Moreover, recharging the cells requires applying a voltage which exceeds the discharge terminal voltage of the cell. The result, for cells having such manganese-oxide spinel cathodes, is that it takes at least 4.1 volts (and preferably more) to de-intercalate lithium from the electrode during charging of the cell. Above about 4.5 volts, however, the solvents used as the electrolyte oxidize and decompose. It is, therefore, necessary to control the charging voltage of these cells below the decomposition potential of the solvent in order to prevent its degradation.

In addition, due to the crystalline structure of spinel manganese oxide, the reversible capacity and cycle life of spinel-based cathodes are sensitive to overcharge and overdischarge. Discharge of the manganese oxide spinel cells must be cut off when the terminal voltage falls to about 3.4 volts (thus limiting the capacity of the material, which typically peaks at about 140 mAh/g). Below about 3.4 volts, the spinel form of the manganese oxide undergoes structural transformation when additional lithium is inserted into $LiMn_2O_4$ and it converts to the orthorhombic form which has very poor cycle ability, and is very unstable, causing the formation of other manganese oxides which are not electrochemically active.

Moreover, insertion of more than one lithium ion per molecule into spinel manganese oxide results in cation mixing between octahedral and tetrahedral sites, which leads to continuous capacity decay. To avoid these problems, the cell voltage must be controlled electronically during the operation of the cell. Such control is-very difficult to manage when a number of large lithium cells are coupled together in series. Spinel-type manganese oxide electrodes typically have internal surface areas less than about 40 $m^2/g$, which limits the rate at which they can be discharged.

Charge/discharge rates and the capacity achieved at those rates are in part determined by the transport of protons or lithium cations through the $MnO_2$ structure. Sol-gel-derived manganese oxides are typically microporous, based on the tendency of MnO2 to form tunnel or layered structures. Intercalating cations must also be transported through the micropores. The small pore size can limit the accessability of electrolyte to the $MnO_2$ interface, particularly for the large (relative to the proton) lithium cations.

Manganese oxide can be produced in a variety of forms, the most common form for battery materials being electrolytic manganese dioxide (EMD) (Chabre et al., 1995). EMD is prepared by anodic electrodeposition from manganese (II) salts. Although EMD has been used in alkaline batteries for many years, recent investigations have shown that it is not optimal for lithium battery applications (Bach et al., 1992). Some efforts have been made to improve the surface area and porosity of EMD (Kurimoto et al., 1995).

Manganese oxides have also been prepared by a variety of sol-gel approaches (Manthiram et al., 1998). Sol-gel chemistry provides a flexible, low temperature process for preparing metal oxides. Another advantage of sol-gel chemistry is that dopant ions can be mixed uniformly in the manganese sol to improve the electrochemical and structural properties of the manganese oxide. Under the appropriate reaction conditions, the sol-to-gel transition can occur so that the metal oxide sol forms a highly porous three-dimensional network. Removal of the pore fluid exclusively by evaporation typically collapses the porous structure due to the large capillary forces exerted on the gel structure at the liquid-gas interface.

If the pore fluid is removed under conditions in which capillary forces are low or extremely low, the inherent mesoporosity and high surface area of the initial gel can be retained. Aerogels are prepared by taking the pore fluid supercritical, wherein there is no longer a liquid-gas interface (Huesing et al., 1998). When supercritical $CO_2$ drying is preferred, the pore liquid of the wet gel is replaced with liquid $CO_2$, which is then taken supercritical. Aerogels of $V_2O_5$ have been prepared that exhibit both high surface areas and high porosities (Salloux et al., 1995; Le et al., 1996; Le et al., 1995).

An alternative to supercritical drying is replacing the pore fluid with a low surface tension liquid, such as an alkane, and evaporating at ambient conditions. Ambient pressure synthesis of $V_2O_5$ (Coustier et al., 1998; Harreld et al., 1998) and $MoO_3$ (Harreld et al., 1998) gels (now denoted as ambigels) have been accomplished. Ambigels exhibit a porosity between that of xerogels and aerogels. $V_2O_5$ aerogels and ambigels have both shown improved lithium capacities relative to xerogels derived from the same sol-gel chemistry (Dong et al., 2000).

Le et al., in U.S. Pat. No: 5,674,642, describe xerogels, cryogels, and aerogels of $V_2O_5$ synthesized from sols and gels.

Lynch, in U.S. Pat. No. 3,977,993, discloses preparing metal oxide aerogels by introducing an aqueous slurry of a hydrogel into an organic solvent such as ethanol until substantially all of the water in the hydrogel is displaced by the organic solvent. The organic solvent is then treated to render it rigorously anhydrous. The organic solvent is removed therefrom by heating the mixture to above the critical point and releasing the organic solvent therefrom at a pressure at least equal to the critical pressure of the organic solvent.

Tillotson et al., in U.S. Pat. Nos. 5,275,796 and 5,409,683; describe a two-step hydrolysis condensation method to form metal oxide aerogels. A high purity metal alkoxide is reacted with water, alcohol solvent, and an additive to form a partially condensed metal intermediate. All solvent and reaction-generated alcohol is removed, and the intermediate is diluted with a nonalcoholic solvent. Aerogels are formed by reacting the intermediate with water, nonalcoholic solvent, and a catalyst, and directly extracting the nonalcoholic solvent.

Anderson et al., in U.S. Pat. No. 5,227,342, disclose making porous ceramic materials with controlled porosity by manipulating the sol used to make the material by gradually removing protons from the metal oxide sol to a predefined threshold.

Hupe et al., in U.S. Pat. No. 4,894,357, disclose that the structural and/or surface characteristics of metal oxides can be adjusted by dehydrating a water-containing oxide gel under supercritical conditions by extracting the water with an extraction agent such as carbon dioxide at a pressure above the critical pressure of the extraction agent.

Dasgupta et al., 5,601,952, disclose preparing lithium-manganese oxide compounds which can be used in a non-aqueous rechargeable lithium battery. A gel of lithium manganese oxide is prepared in a water-miscible organic solvent such as an alcohol. The gel is dried and, depending upon the method of liquid removal a xerogel, aerogel, sonogel, or cryogel is obtained.

Passerini et al., (1999) describe the preparation of $MnO_2$ Xerogels and ambigels (hexanogels in their terminology).

However, to date there has been no method to obtain high surface area, highly mesoporous $MnO_2$ with a controlled, continuously intertwined solid-pore architecture on the nanoscale.

SUMMARY OF THE INVENTION

It is an object of the present invention to overcome the aforesaid deficiencies in the prior art.

It is another object of the present invention to provide a method for preparing nanoscale, mesoporous manganese oxide materials with controlled solid-pore architectures.

It is another object of the present invention to provide a method for preparing nanoscale, mesoporous manganese oxide materials in the form of aerogels and ambigels.

According to the present invention, nanoscale, mesoporous manganese oxide materials are prepared using sol-gel chemistry. As used herein, manganese oxide materials are denoted as $MnO_2$, but this use refers to all species of manganese oxide compounds including, but not limited to: $MnO_2$, $MnO_x$. $yH_2O$, or $MnO_xH_y$ where x=1.5 to 2.5 and y=0.5 to 2, doped manganese oxides, and $AMnO_2$ where A=alkali-metal or alkaline-earth cations. $MnO_2$ gels derived from the same sol exhibit markedly different final structure, based upon how the pore fluid is removed from the gel.

Two new classes of $MnO_2$ materials have been prepared, in which the mesoporous structure of the initial gel is maintained by removing the pore liquid under conditions where the capillary forces that result from removal or pore liquid are either low, forming a $MnO_2$ ambigel, or extremely low, forming a $MnO_2$ aerogel. These materials are particularly useful in alkaline and lithium batteries.

DETAILED DESCRIPTION OF THE INVENTION

Figure 2:
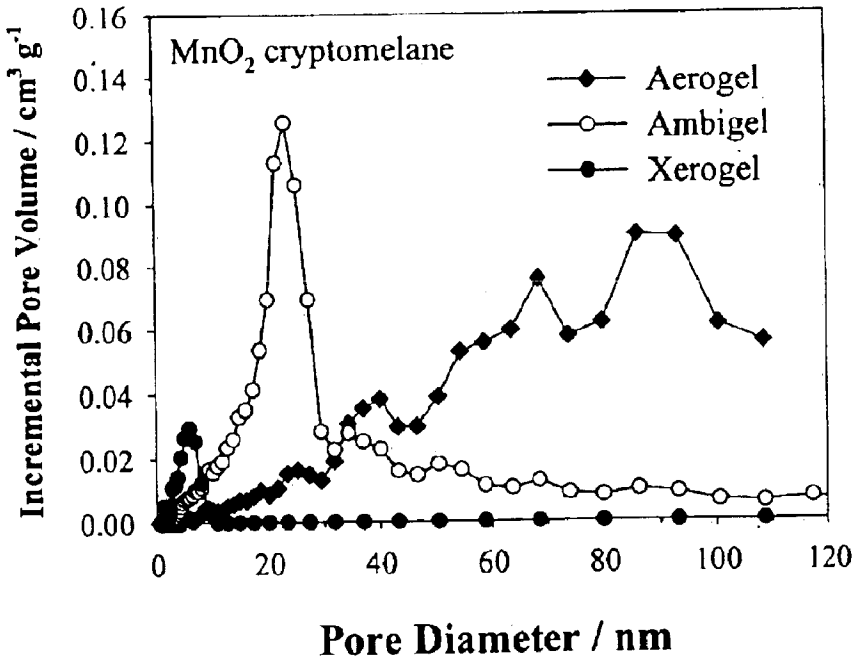
FIGS. 2 and 4 show the pore diameter versus incremental pore volume of the various gels prepared according to the present invention for the cryptomelane and birnessite polymorphs of manganese oxide ambigels and aerogels. Manganese oxide xerogel results have been included for prior art comparison purposes only.
Figure 1:
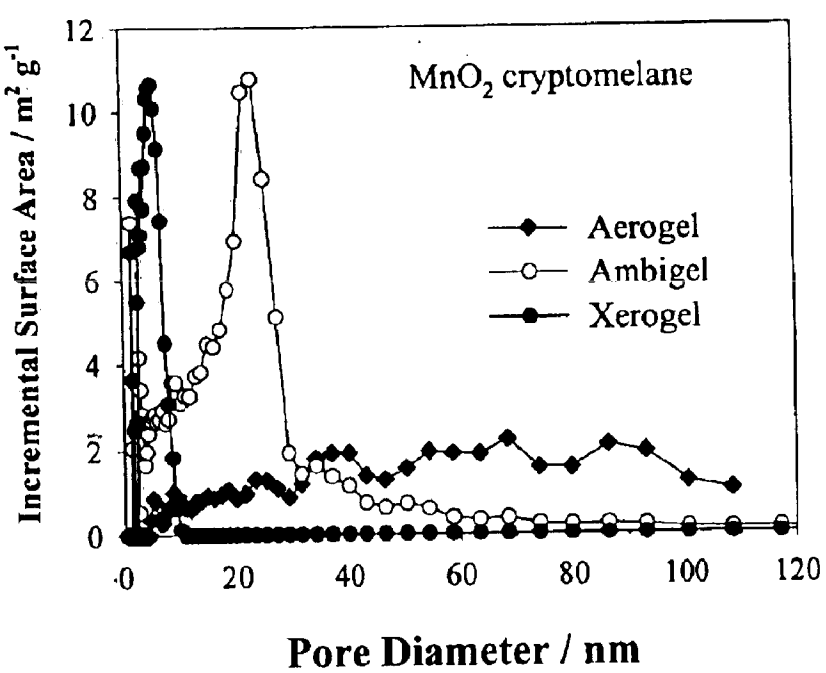
FIGS. 1 and 3 show the pore diameter versus incremental surface area of the various gels prepared according to the present invention for the cryptomelane and birnessite polymorphs of manganese oxide ambigels and aerogels. Manganese oxide xerogel results have been included for: prior art comparison purposes only.
Figure 4:
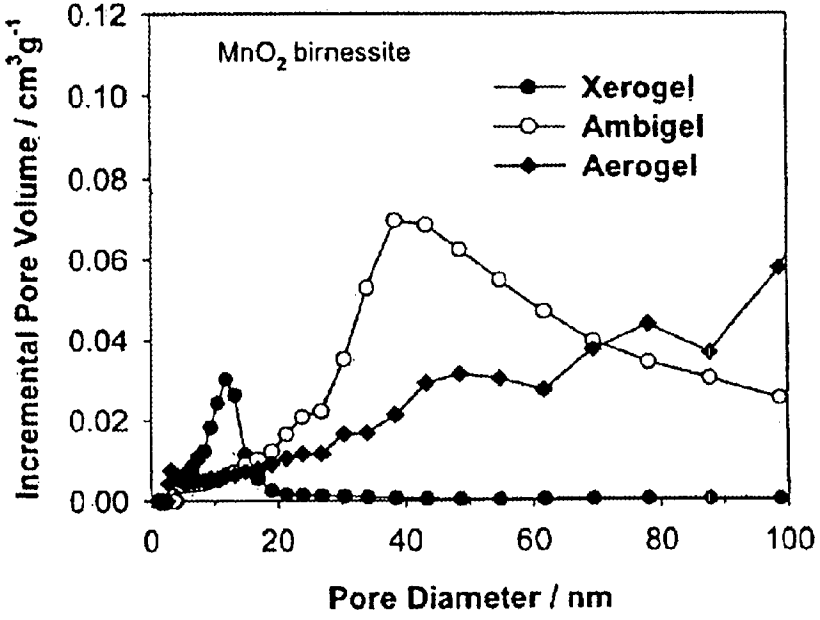
Figure 3:
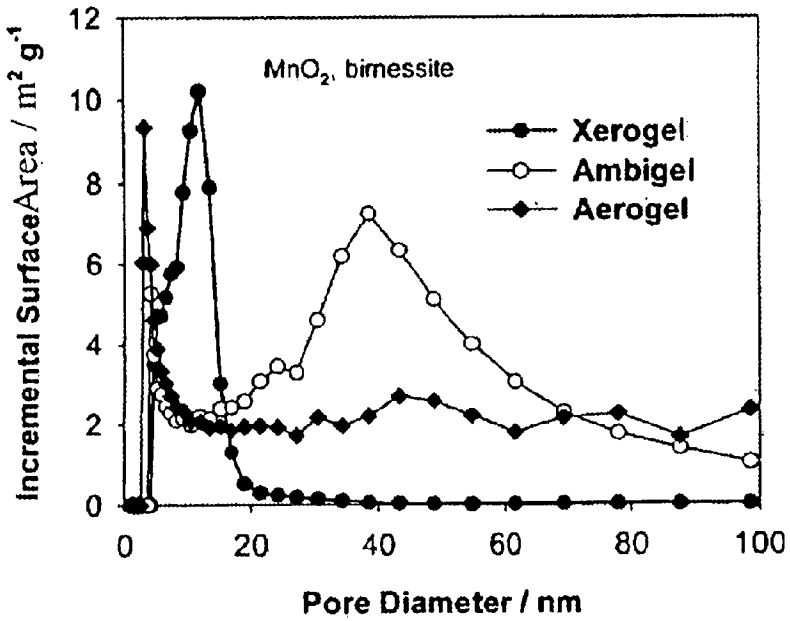

Different types of manganese oxide materials can be prepared from $MnO_2$ gels by removing the pore liquid from the gels by methods that differ in the magnitude of liquid-vapor forces that are established in the pores, i.e., the-magnitude of capillary pressures that develop (Long et al., 2000). The choice of method for removing the pore liquid from the $MnO_2$ gels allows one to control the final pore structure of the $MnO_2$ gel. Classically prepared $MnO_2$ xerogels of cryptomelane and birnessite have very high specific surface areas (~200 $m^2g^{-1}$) that are concentrated in pores less than 10nm in size. The $MnO_2$ aerogels and ambigels, as described in the present invention, have similarly high surface areas but which are distributed in a mesoporous structure with pore sizes from about 3 nm to about 100 nm. These $MnO_2$ aerogels and ambigels also exhibit higher specific pore volumes relative to the xerogel.

The structure of the mesoporous network of the $MnO_2$ aerogels and ambigels will optimize the supply of proton or lithium cation from the supporting electrolyte filling the pores to the nanoscale $MnO_2$ domains in the gel network. Data in the electrochemical literature indicate that ionic conductivity into micropores is lower by orders of magnitude than that in open electrolyte [Koresh and Soffer, 1977]. Microporous surface area in $RuO_2$-based anodes does not contribute to electroactivity [Ardizzone et al., 1982].

Another important feature of the present invention is that the $MnO_2$ ambigels can be obtained in the form of stable monoliths, which, although collapsed to about 30% of their original dimensions; still retain a large cumulative pore volume relative to the aerogel.

Nanoscale $MnO_2$ materials are typically prepared using a sol-gel method that includes reducing a permanganate or substantially equivalent compound by an organic reducing agent in aqueous solution,. as disclosed by Bach et al., 1990. The permanganate used to form $MnO_2$ has a standard potential of about +1.7 V (versus $H_2/H^+$ at 0.0 V). Therefore, any organic reducing agent with a potential less negative than +1.7 V could be used in this process, such as fumaric acid, sodium fumarate, or glucose. Dopant ions may also be dissolved in the sol. The resulting sol is then degassed under a moderate vacuum, allowed to gel-and then age. The resulting gels are rinsed with $H_2O$ and then rinsed in an oxidizing acid, such as sulfuric acid, followed by multiple rinses with water. At this point the gels can be prepared in ambigel or aerogel forms, depending on the drying procedure, as follows.

Aerogel

The water in the $MnO_2$ gels, as obtained above, is exchanged for a polar solvent such as acetone or any other solvent miscible with liquid $CO_2$, $H_2O$, and hydrocarbons, such as amyl acetate. The $MnO_2$ gels are then placed into a supercritical $CO_2$ autoclave, where the solvent in the $MnO_2$ structure is exchanged for liquid $CO_2$ with several rinses. The $CO_2$ is finally removed from the $MnO_2$ gel by taking the $CO_2$ to supercritical conditions.

While any liquid taken supercritical can be used for this procedure, $CO_2$ is preferred because it is not flammable and can be taken to the supercritical state more easily than most other compounds.

Ambigel

The water in the $MnO_2$ gel, as obtained above, is exchanged with a polar solvent such as acetone by rinsing several times with the polar solvent. The polar solvent is then exchanged for a non-polar solvent such as hexane. The $MnO_2$ gels are then dried under ambient pressure conditions or under reduced pressure.

Example—$MnO_2$ Ambigels and Aerogels

Manganese oxide gels were prepared by adding an organic reducing agent such as fumaric acid (i.e., an organic compound having a potential less negative than +1.7 V) to a vigorously stirred 0.20 M solution of $NaMnO_4.H_2O$ or $KMnO_4$ in a 1:3 molar ratio.

The resulting brown sol (from either the potassium or sodium permangantes) was then degassed under a moderate vacuum for eight minutes to facilitate the evolution of $CO_2$. This degassing step ensured that high quality monolithic gels were obtained. The sol was then poured into 5-mL polypropylene molds, where gelation occurred in about one to 1.5 hours. Following a 24-hour aging step, the gels were rinsed with multiple aliquots of $H_2O$ to remove unreacted starting materials or byproducts. The gels were then subjected to a 24-hour rinse in 1M sulfuric acid, which was then followed by multiple rinses with water to remove sulfuric acid and Mn(II) salts. At this point the gels can be prepared in ambigel or aerogel forms, depending on the drying procedure.

Ambigels were prepared by first rinsing the gels with several aliquots of a polar solvent, in this case acetone, and then in multiple aliquots of a non-polar solvent, e.g., cyclohexane. Excess cyclohexane was poured off and the gels were either dried over two days at ambient pressure or vacuum dried at about 60° C. for 24 hours to yield very low density, fragile brown monoliths.

To obtain aerogels, the gels with water-filled pores were rinsed with multiple aliquots of acetone; the gels were then transferred to an autoclave where the acetone was replaced in several rinses with liquid $CO_2$. The $CO_2$ was then taken to its supercritical point and slowly released from the autoclave. The resulting aerogels were fragile brown monoliths.

All of the gels as prepared above were subsequently subjected to an annealing step in air by heating to 300° C. at 2° C./min, holding at about 300° C. for about two hours, and then cooling to room temperature.

Electron diffraction measurements and transmission electron microscopy confirmed that all sol-gel-derived $MnO_2$ materials annealed to 300° C. were single-phase polymorphs, either nanocrystalline cryptomelane ($KMn_4$ preparation) or birnessite ($NaMnO_4$ preparation). Annealing to a temperature of 300° C., brings the gels to constant weight but does not expose them to temperatures where a crystallization transition at 550° C. to $Mn_2O_3$ occurs, as observed by differential scanning calorimetry. The surface areas and pores-size distributions were determined by $N_2$ physisorption.

The following table shows micropore physisorption results for $MnO_2$ sol-gel derived materials.

TABLE 1

Micropore physisorption results for $MnO_2$ sol-gels-derived materials.

| $MnO_2$ sample | BET Surface Area $m^2g^{-1}$ | BJH Pore Volume $cm^3g^{-1}$ | BJH Average Pore Diamer/nm |
|---|---|---|---|
| Xerogel, Cryptomelane | 180 | 0.31 | 5 |
| Ambigel, Cryptomelane | 190 | 1.1 | 25 |
| Aerogel Cryptomelane | 210 | 0.80 | 16 |
| Xerogel, Birnessite | 140 | 0.36 | 9 |
| Ambigel, Birnessite | 210 | 1.6 | 29 |
| Aerogel, Birnessite | 250 | 1.8 | 32 |

BET surface area denotes the Brunauer-Emmett-Teller theory for determining surface area from physisorption data. BJH denotes the Barrett-Joyner-Halenda method for determining pore volume from physisorption data. Please note that manganese oxide xerogel results have been included for prior art comparison purposes only.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus, the expressions "means to . . ." and "means for . . .", or any method step language, as may be found in the specification above and/or in the claims below, followed by a functional statement, are intended to define and cover whatever structural, physical, chemical, or electrical element or structure, or whatever method step, which may now or in the future exist which carries out the recited :functions, whether or not precisely equivalent to the embodiment or embodiments disclosed in the specification above, i.e., other means or steps for carrying out the same function can be used; and it is intended that such expressions be given their broadest interpretation.

What is claimed is:

1. A method for preparing high surface area, nanoscale, mesoporous manganese oxide material with controlled solid-pore architecture comprising:

removing pore fluid from a gel of manganese oxide material under conditions in which capillary forces are low or extremely low to thereby form said material.

2. The method according to claim 1, wherein said material comprises a manganese oxide polymorph.

3. The method according to claim 2, wherein said manganese oxide polymorph comprises cryptomelane or birnessite.

4. The method according to claim 1, further comprising an initial step of preparing said gel of manganese oxide material with $KmnO_4$ to thereby form a cryptomelane gel.

5. The method according to claim 1, further comprising an initial step of preparing said gel of manganese oxide material with $NaMnO_4$ to thereby form a birnessite gel.

6. The method according to claim 1, wherein said step of removing pore fluid from a gel of manganese oxide material comprises:

exchanging pore fluid in said gel of manganese oxide material with a low surface tension non-polar liquid; and evaporative drying said gel of manganese oxide material under ambient-pressure conditions thereby forming a ambigel.

7. The method according to claim 1, wherein said step of removing pore fluid from a gel of manganese oxide material comprises:

exchanging pore fluid in said gel of manganese oxide material for an organic solvent which is miscible with liquid $CO_2$, water, and hydrocarbons;

taking said carbon dioxide to a supercritical state; and releasing the supercritical carbon dioxide fluid from the gel to thereby form an aerogel.

8. The method according to claim 7, wherein said organic solvent is selected from the group consisting of amyl acetate and acetone.

9. The method according to claim 1, wherein said step of removing pore fluid from a gel of manganese oxide material comprises:

exchanging pore fluid in said gel of manganese oxide material for a polar organic solvent;

exchanging said polar organic solvent for a non-polar organic solvent; and removing said non-polar organic solvent to thereby form an ambigel.

10. The method according to claim 9, wherein said polar organic solvent is acetone.

11. The method according to claim 9, wherein said non-polar solvent is hexane.

12. The method according to claim 9, wherein said non-polar solvent is cyclohexane.

13. The method according to claim 1, further comprising the step of:

doping said gel with a dopant selected from Group I, Group II, a transitional metal, and Si, or any combination thereof.

14. An ambigel of a manganese oxide material, said material being prepared from a cryptomelane sol of manganese oxide materials.

15. An ambigel of a manganese oxide material, said material being prepared from a birnessite sol of manganese oxide materials.

16. An aerogel of a manganese oxide material, said material being prepared from a cryptomelane sol of manganese oxide materials.

17. An aerogel of a manganese oxide material, said material being prepared from a birnessite sol of manganese oxide materials.

18. A high surface area, nanoscale material suitable for use as a battery electrode, comprising an ambigel of a manganese oxide polymorph material.

19. A material as in claim 18, wherein said ambigel of a manganese oxide polymorph material is selected from cryptomelane or birnessite.

20. A high surface area, nanoscale material suitable for use as a battery electrode, comprising an aerogel of a manganese oxide polymorph material.

21. A material as in claim 20, wherein said aerogel of a manganese oxide polymorph is selected from cryptomelane or birnessite.

* * * * *